Jan. 14, 1936.  J. STEIN ET AL  2,027,564
ROLLING MACHINE
Filed May 1, 1935  3 Sheets-Sheet 1
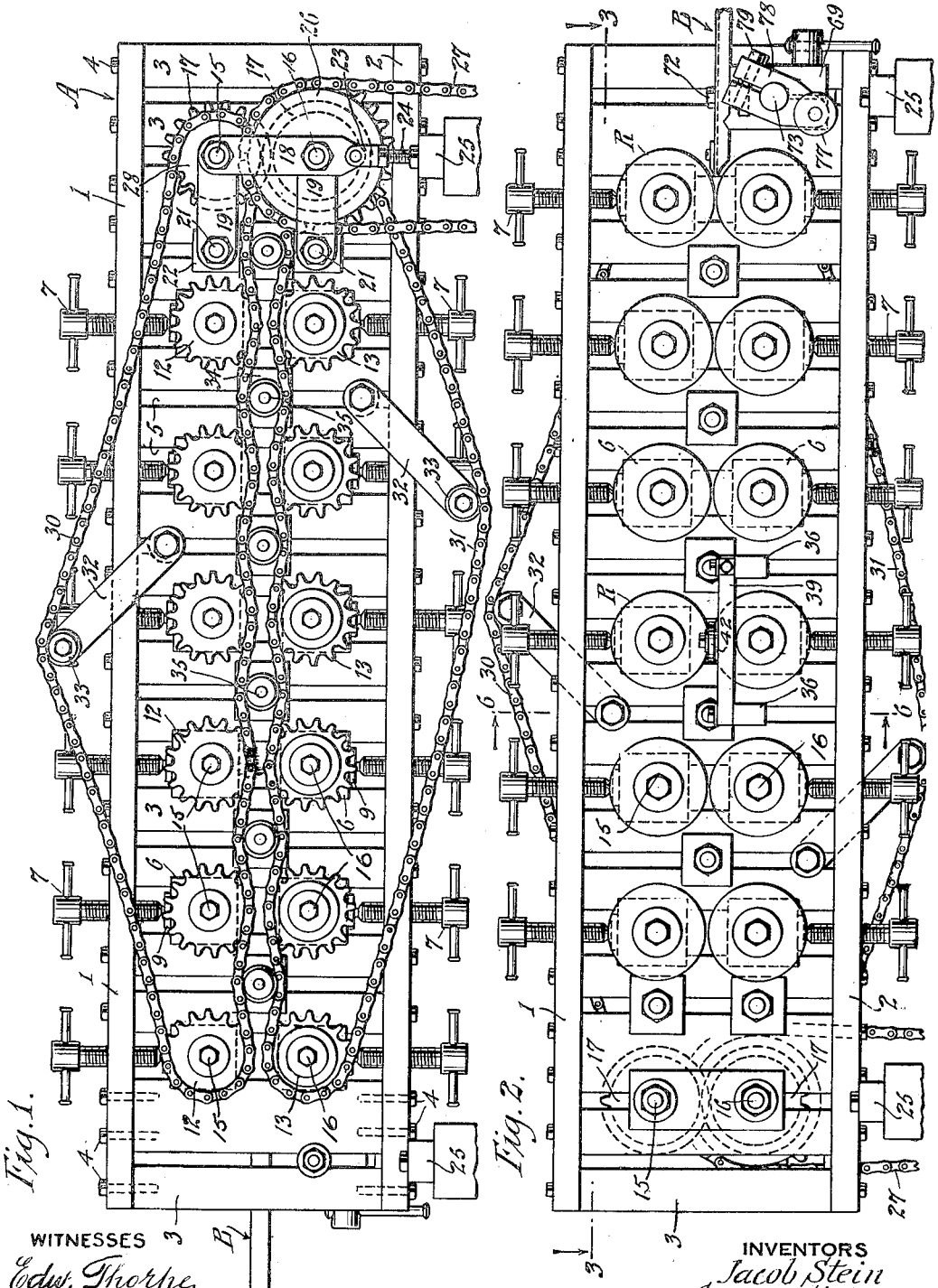
WITNESSES
Edw. Thorpe
A.W. Foster
INVENTORS
Jacob Stein
George Stein
BY
Munn, Anderson & Liddy
ATTORNEYS

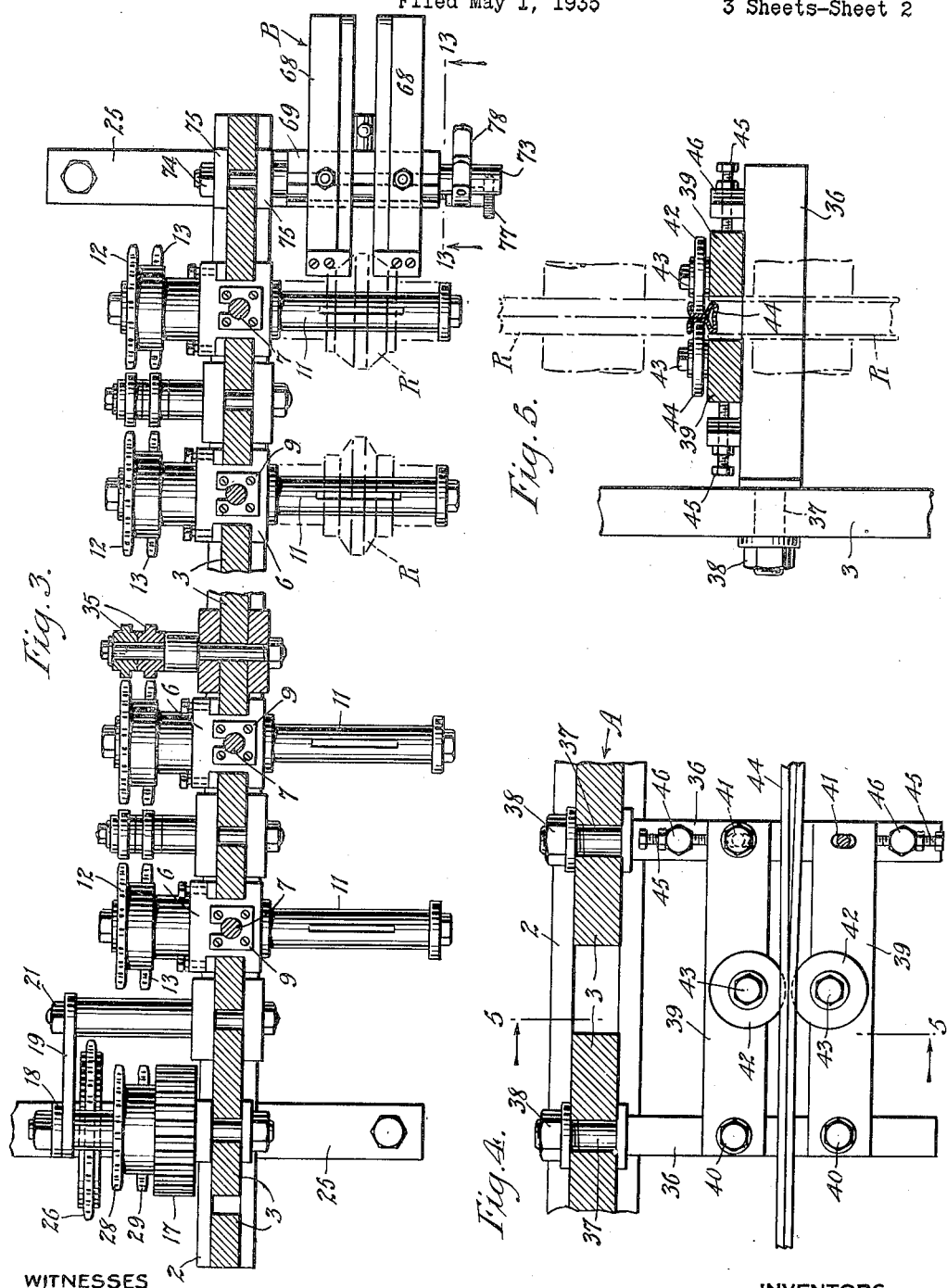

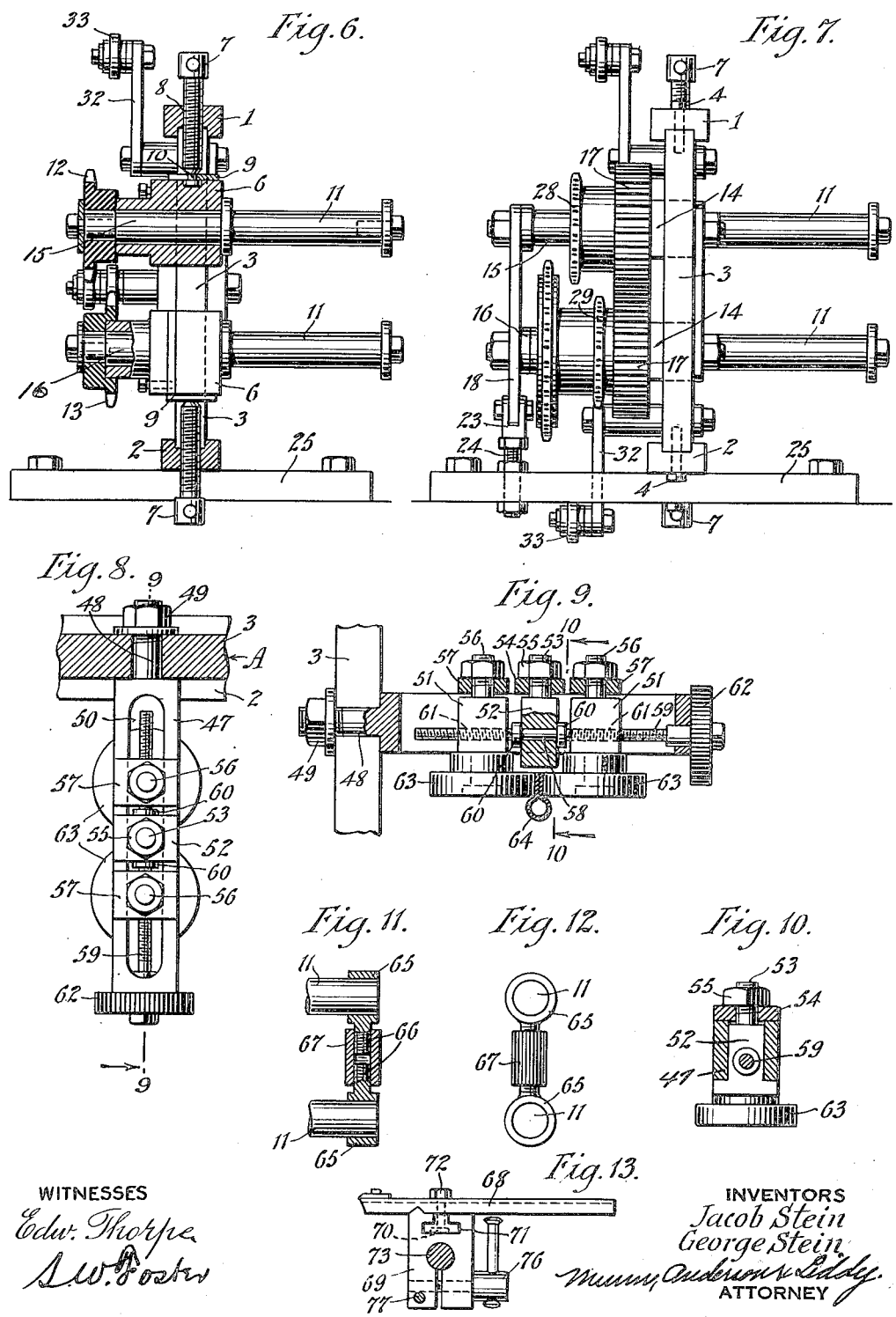

Patented Jan. 14, 1936

2,027,564

UNITED STATES PATENT OFFICE 2,027,564

ROLLING MACHINE

Jacob Stein, College Point, and George Stein, Astoria, N. Y.

Application May 1, 1935, Serial No. 19,308

8 Claims. (Cl. 153—28)

This invention relates to rolling machines and more particularly to machines for cold rolling strips of metal into any desired cross-sectional shape.

An object of the invention is to provide a machine of this character in which the roll mounts are capable of vertical adjustment in an improved frame so that the bars may be maintained straight or may be given a longitudinal curvature.

A further object is to provide a frame which is composed of bars, preferably of cold rolled steel, so assembled as to provide a single wall frame with vertically extending slots therein for the accommodation of bearing blocks in which shafts are mounted and on said shafts suitable rolls are adapted to be keyed.

A further object is to provide such a machine with simple adjusting means to adjust the bearing blocks vertically as desired through the medium of screws swiveled to bearing blocks carrying the shafts on which the rollers are mounted, said screws being adjustable in the frame.

While our improved machine is especially adapted for light work in shaping strips of metal for use in the aircraft industry, such for example as the forming of cap strips for wing ribs, stiffeners for wing tips and pontoons, and for the frame work of the fuselage and other parts of the plane, it will of course be understood that the machine is capable of making strips of any cross-sectional shape for any purpose desired.

With these and other objects in view, the invention consists in certain novel features of construction and combinations and arrangements of parts, all of which will be more fully identified, described, pointed out and claimed.

In the accompanying drawings—

Fig. 1 is a view in rear elevation of our improved machine;

Fig. 2 is a view in front elevation;

Fig. 3 is a broken view on a somewhat enlarged scale on the line 3—3 of Fig. 2;

Fig. 4 is a view mainly in plan and partly in section, illustrating an attachment such as shown at the central portion of Fig. 2;

Fig. 5 is a view in section on the line 5—5 of Fig. 4;

Fig. 6 is a view in vertical section on the line 6—6 of Fig. 2, the attachment being omitted;

Fig. 7 is an end view of a machine looking at the righthand end of Fig. 1;

Fig. 8 is a view similar to Fig. 4, illustrating another attachment;

Fig. 9 is a view in section on the line 9—9 of Fig. 8;

Fig. 10 is a view in section on the line 10—10 of Fig. 9;

Fig. 11 is a fragmentary view in vertical section illustrating a form of coupling which may be used to prevent spreading of the shafts when the rolls are doing heavy work;

Fig. 12 is a view in elevation of the coupling shown in Fig. 11;

Fig. 13 is a view in section on the line 13—13 of Fig. 3.

The reference character A is employed to indicate generally the frame of the machine. This frame consists of bars, preferably of cold rolled steel, and includes upper and lower horizontal bars 1 and 2 between which vertical bars 3 are secured. We have illustrated as securing means screws 4 which are projected through the bars 1 and 2 and screwed into the ends of the bars 3. The bars 3 are spaced apart so as to provide between them vertically extending slots 5 and the bars may be so spaced as to provide slots of any desired width. In the bar construction illustrated, the alternate slots are of different widths but of course the arrangement of slots may be varied as desired. In each of the wider slots 5 upper and lower bearing blocks 6 are mounted and are adjustable vertically in the slots by means of screws 7. These screws 7 extend through the horizontal bars of frame A which are provided with screw threaded openings 8 to accommodate them, and the inner ends of said screws have swiveled coupling engagement with the blocks 6. For this purpose swiveled plates 9 are secured to the blocks and are suitably slotted for the entrance of the screws and engage in annular grooved portions 10 in the screws. The bearing blocks provide a rotary mounting for shafts 11 and these shafts project forwardly from the frame A and are adapted to receive thereon any suitable shaping rolls R, as illustrated by dot and dash lines in Fig. 3. The rear ends of the shafts 11 project beyond the bearing blocks 6 and beyond the frame A and have sprocket wheels keyed thereon. For convenience of description, the sprocket wheels on the upper set of shafts are given reference character 12, and the sprocket wheels on the lower set of shafts are given reference character 13.

In one of the slots 5 adjacent one end of frame A a pair of bearing blocks 14 are mounted and provide rotary mounting for shafts 15 and 16 respectively. On these shafts 15 and 16 inter-meshing gears 17 are mounted to compel them to turn together. The other ends of these shafts 15 and 16 are connected by a vertical link 18 and this link 18 is pivotally connected to two horizontal links 19. These links 19 are pivotally connected, as shown at 21, to a block or blocks 22 secured in one of the slots 5 of the frame A. The lower end of link 18 is provided with a pivoted shackle 23 having screw-threaded engagement with an adjusting screw 24 mounted in a fixed part 25 of the frame A, and in the particular form illustrated this fixed part 25 constitutes a transverse bar or base bar for frame A, and any suitable number of these transverse bars or base bars may be provided. The purpose of the screw 24 is to allow the shafts 15 and 16 to be adjusted vertically thereby but always maintained in proper spaced relationship and take the thrust of the drive chain.

A drive sprocket wheel 26 is mounted on the lower shaft 16 and a sprocket chain 27 engages this wheel and may be driven from any source of power. Sprocket wheels 28 and 29 are mounted on the upper and lower shafts 15 and 16, and the upper sprocket wheel 28 is adapted to drive an endless sprocket chain 30 which engages all of the upper set of sprocket wheels 12, and an endless sprocket chain 31 is driven by the lower sprocket wheel 29 and operatively engages all of the lower set of sprocket wheels 13. To take up slack in these chains 30 and 31 arms 32 are pivotally connected to frame A and carry idlers 33 engaging the chains, as clearly shown in Fig. 1 of the drawings. In the smaller slots 5 bearing blocks 34 are secured and support idlers 35 which engage runs of both chains 30 and 31 spacing these runs of the chains between the sets of sprocket wheels 12 and 13 and tending to maintain the chains in operative engagement with the sprocket wheels 12 and 13.

The machine may have various forms of attachment, one of which is illustrated in side elevation in Fig. 2, and in detail in Figs. 4 and 5 of the drawings. This attachment comprises a pair of bars 36 which have cylindrical screw-threaded ends 37 projected through slots in frame A and securely clamped therein by nuts 38. On these bars 36 and extending at right angles thereto are a pair of arms 39. These arms 39 are pivotally connected, as shown at 40, to one bar 36 and have slot and pin connections 41 with the other bar 36. Pressure rolls 42 have rotary mounting on vertical studs 43 secured to arms 39 and are adapted to exert lateral pressure against a strip 44 fed between them. Set screws 45 adjustable in posts 46 on one of the arms 36 engage the sides of arms 39 so as to adjust said arms sufficiently to accurately position the rolls 42.

Another form of attachment is illustrated in Figs. 8 and 9 of the drawings. This attachment consists of a single bar 47 having a cylindrical screw-threaded end 48 projected through a slot in frame A and clamped therein by a nut 49. This bar 47 has a longitudinal slot 50 in which two bearing blocks 51 are located with a center block 52 between them. The center block 52 has a threaded stud 53 thereon which is projected through a perforated plate 54 on top of the bar 47, and a nut 55 is screwed on to the stud to securely clamp the block 52 against movement. The bearing blocks 51 also have threaded studs 56 which project through plates 57 on top of bar 47 so that these blocks 51 may also be securely clamped after they are once adjusted. The center block 52 has an opening or bearing 58 therein which provides rotary mounting for a right and lefthand screw 59 with collars 60 on the screw at opposite sides of block 52 to hold the screw against longitudinal movement. This screw has threaded engagement with both of the blocks 51, as clearly shown at 61, so that when a hand wheel 62 on the end of the screw at the outer end of the bar 47 is turned, these bearing blocks 51 may be adjusted toward and away from each other. Pressure rolls 63 are mounted to turn on the lower ends of the blocks 51 so that they may roll freely and exert lateral pressure on a strip 64 moving between them.

In order to prevent deflection of the shafts 11, where especially heavy work is being done by the rolls, it is advisable in some cases to provide a coupling link for the shafts as shown in detail in Figs. 11 and 12 of the drawings. This coupling link comprises a pair of eyes 65 receiving the ends of the shafts 11, and these eyes have right and lefthand screw threaded studs 66 thereon engaging internal threads in an adjusting sleeve 67 so that the eyes are connected by a turnbuckle which allows for any suitable or desired adjustment.

The reference character B is employed to indicate generally a guide for the entrance of a strip and direct the same in perfect alignment with the pressure rolls. This guide is shown at the righthand end of Figs. 2 and 3 and comprises a pair of spaced guide plates 68 mounted on a block 69 and capable of adjustment toward and away from each other through the medium of inverted T-shaped slides 70 mounted in a similarly shaped slot 71 in block 69. Clamping screws 72 extend through the plates 68 and are screwed into the slides 70 and when screwed home they firmly clamp the plates to the block. The block 69 is mounted on a rod 73 which in turn is clamped in one of the slots 5 of frame A by means of a nut 74 and spacers 75. The block 69 is split and has a clamping screw 76 extending across the split portion thereof so that when this screw is adjusted it will tighten or loosen the block on the rod 73 and hence permit adjustment of the block on the rod or securely clamp the same against movement. As a means to adjust the block 69 on the rod, we provide a set screw 77 mounted in a split block 78 clamped on the rod 73 by a screw 79, and one end of this set screw 77 screws into the end of block 69 and when turned can adjust the block, and center the strip with the rods.

The operation of the machine as a whole is as follows: Strips of material are guided to the rolls by the guide B and as a strip passes between the rolls it is given the desired cross-sectional shape. By reason of the arrangement of chains and sprocket wheels, both the upper set and the lower set of rolls are positively driven, but it is apparent that whenever it may be desired to have only one set of rolls driven or only one roll of a pair driven, a sprocket wheel can be removed and an idler substituted therefor. By reason of the ease with which the roll mounts can be adjusted vertically in the frame, any tendency of the strip to bend longitudinally can be overcome or any curvature can be imparted to the strip. All parts of the machine are readily accessible, which is of great importance in setting up the machine for a certain job, and by reason of the arrangement of the frame consisting of a single slotted wall several parts can be readily assembled, easily replaced, and easily adjusted, and attachments such as above described, or other attachments, can be readily secured. In other words, the machine is a very flexible one and dispenses altogether with the necessity of providing a cast metal frame to support the parts for different work.

While we have illustrated and described what we believe to be a perfect embodiment of the invention, it is obvious that various changes may be made in the general form and arrangement of parts without departing from the spirit and scope of the invention, and hence we do not limit ourselves to the precise details set forth but consider ourselves at liberty to make such changes and alterations as fairly fall within the spirit and scope of the appended claims.

We claim:

1. A rolling machine, comprising a single wall frame comprising horizontal bars connected by spaced vertical bars providing vertically extending slots in the wall, blocks adjustable in the slots, shafts extending through the blocks and adapted to receive shaping rolls thereon at the front of the frame, sprocket wheels on the shafts at the back of the frame, and sprocket chains engaging the sprocket wheels, and said vertical bars also forming slots between the slots for the bearing blocks for the reception of attachments.

2. A rolling machine, including a single wall frame, comprising upper and lower parallel bars, vertical bars between the upper and lower bars and secured thereto and spaced apart, providing slots for the accommodation of roll mounts, said roll mounts comprising bearing blocks, shafts extending through the bearing blocks and adapted to receive rolls on one end and driving means on the other end, adjusting screws located in screw-threaded openings in the upper and lower bars and having swiveled connection with the bearing blocks, sprocket wheels on the shafts at the rear of the wall, an endless chain connecting the upper set of sprocket wheels, an endless chain connecting the lower set of sprocket wheels, and idle sprocket wheels mounted in the walls between the slots for the bearing brackets and engaging runs of both chains.

3. A rolling machine, comprising a single wall, pairs of bearings blocks adjustable vertically in the wall, shafts in the bearing blocks adapted to receive rolls, other blocks adjustable in the wall between the pairs of bearing blocks, sprocket wheels on the shafts at the back of the wall, two drive chains, one drive chain engaging the sprocket wheels of the lower shafts, the other sprocket chain engaging the sprocket wheels of the upper shafts, and idlers on the bearing blocks between the sets of shafts engaging both chains and holding them in operative engagement with the sprocket wheels.

4. A rolling machine, comprising a single wall, pairs of bearing blocks adjustable vertically in the wall, shafts in the bearing blocks adapted to receive rolls, other blocks adjustable in the wall between the pairs of bearing blocks, sprocket wheels on the shafts at the back of the wall, two drive chains, one drive chain engaging the sprocket wheels of the lower shafts, the other sprocket chain engaging the sprocket wheels of the upper shafts, and idlers on the bearing blocks between the sets of shafts engaging both chains and holding them in operative engagement with the sprocket wheels, a drive shaft, a counter shaft, gearing connecting said drive shaft and counter shaft, and sprocket wheels on the drive shaft and counter shaft operatively engaging the respective chains.

5. A rolling machine, comprising a single wall frame having vertical slots therein, roll mounts in said slots for vertically disposed rolls, an attachment secured in certain of said slots and horizontally disposed rolls on said attachment, pivoted arms supporting the horizontal rolls, and means at one end of said arms for adjusting said rolls toward and away from each other.

6. A rolling machine, including a single vertical wall, pairs of roll-receiving shafts mounted in said wall, means for driving said shafts, and coupling means at the ends of the shafts including eye screws receiving the shafts and a sleeve connecting the eye screws and constituting a turnbuckle.

7. A rolling machine, comprising a single wall consisting of upper and lower bars with vertical spaced bars between them forming a series of vertical slots for the accommodation of roll shaft bearing blocks, other slots between the bearing block slots for the accommodation of attachments, said wall constituting the sole support for all the operating mechanism of the rolling machine, and clamping plates bridging the last mentioned slots and bracing the wall structure.

8. A rolling machine, comprising a single wall consisting of upper and lower bars connected by vertical spaced bars, roll shaft bearing blocks located in alternate slots, roll shafts in said bearing blocks projecting beyond the wall, idle shafts supported in the slots between the bearing block slots, sprocket wheels on all of said shafts at one side of the wall, and endless chains connecting the sprocket wheels.

JACOB STEIN.
GEORGE STEIN.